(12) United States Patent
Saito

(10) Patent No.: US 6,850,343 B1
(45) Date of Patent: Feb. 1, 2005

(54) SYSTEM AND METHOD FOR SCANNER CONTROL USING THINNING-OUT PROCESSING

(75) Inventor: Kazuyuki Saito, Shibata-machi (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 923 days.

(21) Appl. No.: 09/703,717

(22) Filed: Nov. 2, 2000

(30) Foreign Application Priority Data

Nov. 18, 1999 (JP) ............................................ 11-327845
Oct. 16, 2000 (JP) ....................................... 2000-314689

(51) Int. Cl.⁷ .............................................. H04M 1/04
(52) U.S. Cl. ....................... 358/474; 358/1.5; 358/412; 358/448
(58) Field of Search ........................ 358/474, 1.5, 412, 358/448, 472, 486

(56) References Cited

U.S. PATENT DOCUMENTS 5,086,346 A * 2/1992 Fujisawa .................... 358/453
5,396,286 A * 3/1995 Ishizuka .................. 348/208.6
5,497,192 A * 3/1996 Ishizuka ................ 348/208.13
6,486,971 B1 * 11/2002 Kawamoto .................. 358/1.2

FOREIGN PATENT DOCUMENTS

JP    7-023177    1/1995
JP    7-212574    8/1995
JP    11-289438    10/1999

* cited by examiner

Primary Examiner—Kimberly Williams
Assistant Examiner—Negussie Worku
(74) Attorney, Agent, or Firm—Oblon, Spivak, McClelland, Maier & Neustadt, P.C.

(57) ABSTRACT

The present invention provides a scanner control method capable of being shared even by a printer which is relatively low in write speed as compared with the read speed. In the case where a printer having a relatively lower write speed than the read speed is connected, an original image reading operation is performed at a high read speed, but the original image on the same main scan line is read by a number of times, m, (e.g., m=2) corresponding to a magnification ratio between the read speed and the write speed while decreasing the read speed in a sub scan direction, and only the image data obtained from a single read of the main scan line out of the m times of read is outputted by a thinning-out processing. By so doing, there is performed a read operation substantially matching the low write speed without any change in the actual read speed of a read unit. In this way it becomes possible for a scanner to be shared even by a printer whose write speed is relatively low in comparison with the read speed.

23 Claims, 15 Drawing Sheets

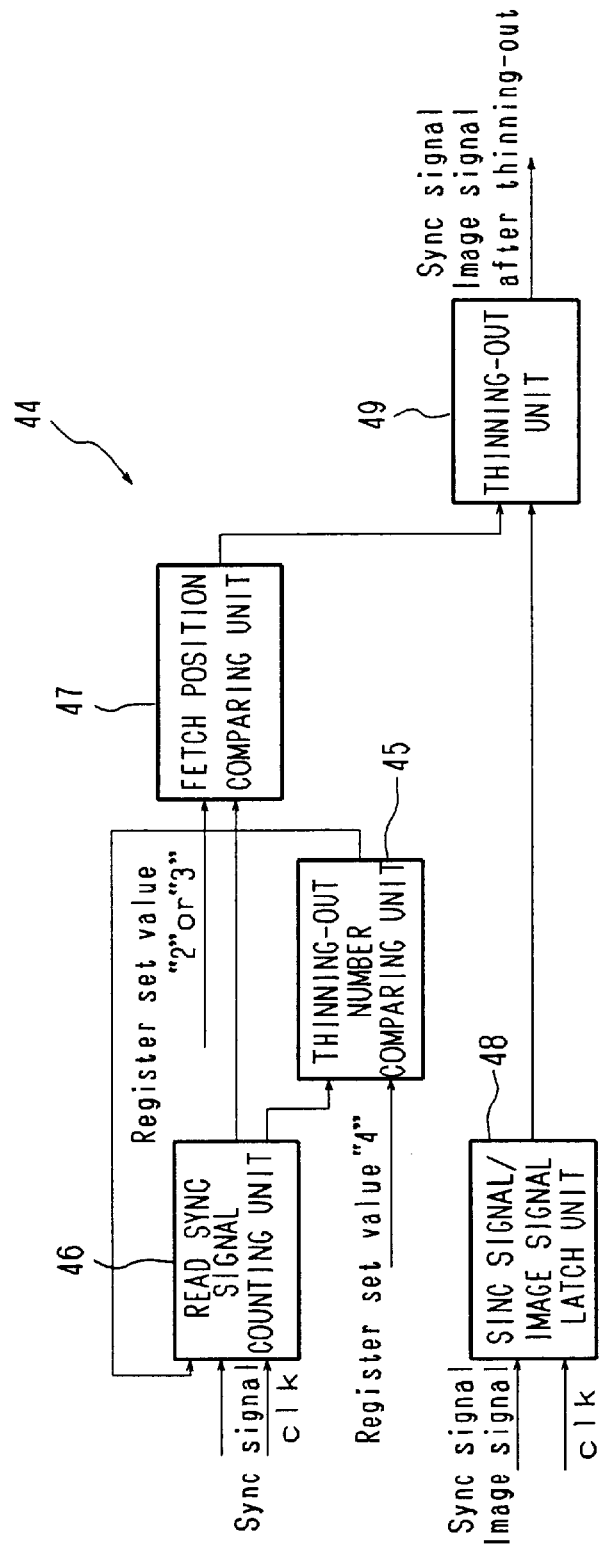

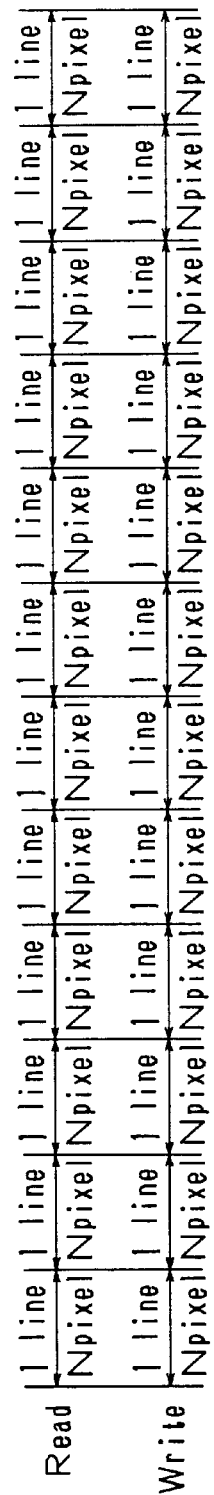
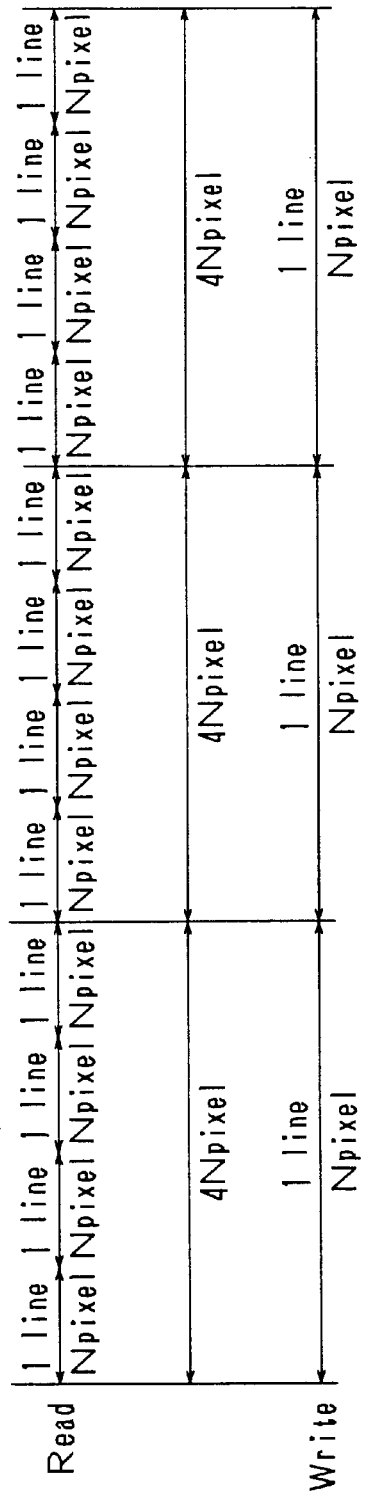

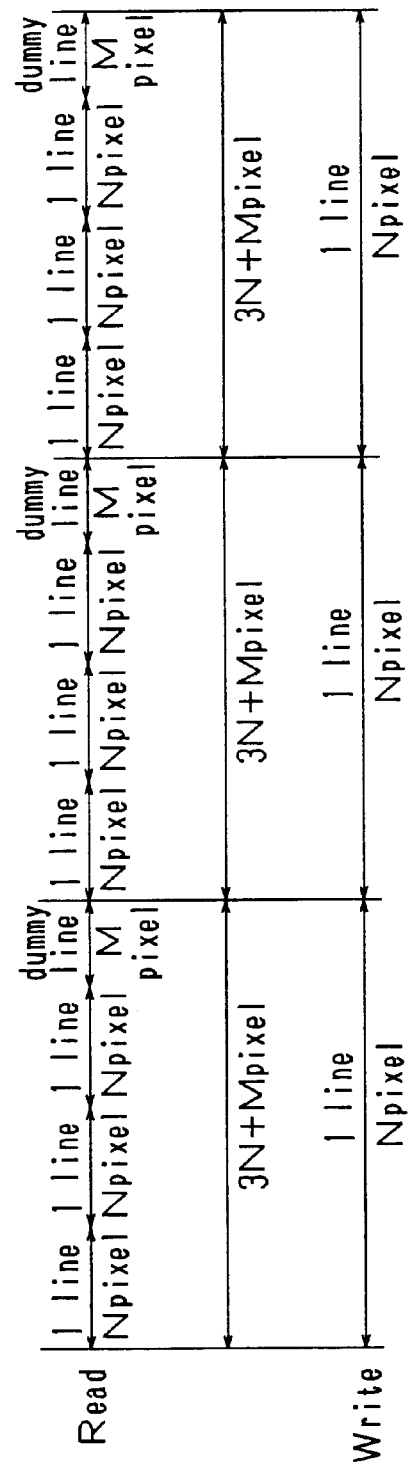

SYSTEM AND METHOD FOR SCANNER CONTROL USING THINNING-OUT PROCESSING

BACKGROUND OF THE INVENTION

1. Field of the Invention

The present invention relates to a scanner control method, a scanner, a duplicate printer, a mediating device, and a storage medium. More particularly, the present invention is concerned with a scanner control method, a scanner, a duplicate printer, a mediating device, and a storage medium, premising the use in an environment in which the printer is connected to the scanner, the scanner having a line-like photoelectric transducer which reads an original image by photoelectric conversion, the printer having a relatively lower write speed than the read speed of the line-like photoelectric transducer.

2. Description of the Prior Art

Generally, a copying machine is used for duplicating an original image. Particularly, with the recent development of digital technique, digital copying machines have become more and more popular.

As shown in FIG. 1, a digital copying machine is roughly composed of a scanner 2 constituted mainly by a read unit 1, an image processing unit 3, and a printer 5 constituted mainly by a write unit 4. The read unit 1 is provided with one-dimensional array-like CCDs 6 used commonly as line-like photoelectric transducers which read an original image by making photoelectric conversion on the basis of reflected light from an exposure-lighted original. The image processing unit 3 is provided in the scanner 2 or in the printer 5 and performs an image processing for the read original image. For example, the image processing unit 3 is provided with a black offset correction circuit 7, a shading correction circuit 8, an image magnification varying circuit 9, a filter circuit 10, an image quality processing circuit 11, a video pass circuit 12, a test pattern generating circuit 13, a command register 14, a memory 15, an I/F control circuit 16. The printer 5 forms an electrostatic latent image on a photosensitive member in accordance with an electrophotographic process, develops the latent image, and thereafter transfers the resulting visible image onto a transfer paper. The write unit 4 is provided with a light source such as a semiconductor laser (LD) or an LED for writing onto the photosensitive member and is also provided with a drive unit 17 for driving the writing light source (LD or LED).

Such a digital copying machine is becoming higher and higher in its processing speed. For example, the read cycle of the CCDs 6 in the scanner 2 and the write cycle in the write unit 4 are both several hundred microseconds per line (this is also the case with the processing cycle in the image processing unit 3). Thus, the writing process in one line may be executed while the reading process in one line is executed, by using FIFO (First In First Out) memory, so that the reading process and the writing process can be executed in parallel.

On the other hand, when an original image is to be duplicated and when the number of sheets to be duplicated (printed) is large, a stencil printer is advantageous and therefore a digital printer capable of duplicate-printing an original image is also available. Also in such a digital printer, for example in the case of a thermal stencil printer, as shown in FIG. 2, it is basically composed of a scanner 22 constituted mainly by a read unit 21, an image processing unit 23, and a printer 25 constituted mainly by a write unit 24. The scanner 22 and the image processing unit 23 are the same as in the digital copying machine, but as to the write unit 24 in the printer 25, it is greatly different from the digital copying machine in that it uses a thermal head as a process write head for stencil sheet, and it is provided with a thermal head driving unit 26 for driving the thermal head. The process write speed cannot be made such high as in the write processing in the electrophotographic process and actually the write cycle in the write unit 24 is considered to be about several milliseconds per line.

Problems involved in such prior art will now be described. In the digital printer, because of a different write-side processing speed (write cycle) even in spite of the same original image reading and image processing, a dedicated scanner 22 is designed so as to give a read cycle by CCDs 27 of several milliseconds or so per line also on the read unit 21 side.

That is, the high-speed scanner 2 for a digital copying machine, which is available widely, cannot be shared by digital printers; in other words, in producing a digital printer, it is necessary to develop a dedicated scanner 22, which results in an increase of the development cost.

Practical use of an interface like USB enables a scanner connected with a network to use as a network scanner. Accordingly, it is supposed that the writing process using CCDs in one line is executed while the reading process in one line is executed, by using FIFO (First In First Out) memory, so that the reading process and the writing process is executed in parallel. However, reading speed of the scanner and writing speed of the printing device are not equal, so that the above problem will occur.

SUMMARY OF THE INVENTION

It is an object of the present invention to provide a scanner control method, a scanner, and a duplicate printer capable of being shared even by a printer which is relatively low in write speed as compared with the read speed.

According to the present invention, in the case where a printer having a relatively lower write speed than the read speed of a line-like photoelectric transducer which is for reading an original image by photoelectric conversion, is connected to a scanner having the line-like photoelectric transducer, the original image on the same main scan line is read by a number of times, m, corresponding to a magnification ratio between the read speed and the write speed while decreasing the read speed in a sub scan direction, and only the image data obtained from a single read of the main scan line out of the m times read of the original image is outputted to the printer side by a thinning-out processing. Thus, in the case where a printer having a relatively lower write speed than the read speed is connected, an original image reading operation is performed at a high read speed, but the original image on the same main scan line is read by a number of times, m, corresponding to a magnification ratio between the read speed and the write speed while decreasing the read speed in the sub scan direction, and only the image data obtained from a single read of the main scan line out of the m times of read is outputted by a thinning-out processing. By so doing, there is performed a read operation substantially matching the low write speed without any change in the actual read speed of the read unit. In this way it becomes possible for the scanner to be shared even by a printer whose write speed is relatively low in comparison with the read speed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which:

FIG. 8 is a block diagram showing a configuration example in which a thinning-out circuit is used as thinning-out means;

FIG. 12 is a schematic diagram showing a basic example of an original image read-write processing with attention paid to the number of pixels;

FIG. 13 is a schematic diagram showing a basic example of an original image read-write processing with attention paid to the number of pixels in the case of including a fraction of m=3.5;

DETAILED DESCRIPTION OF THE PREFERRED EMBODIMENT

Figure 1:
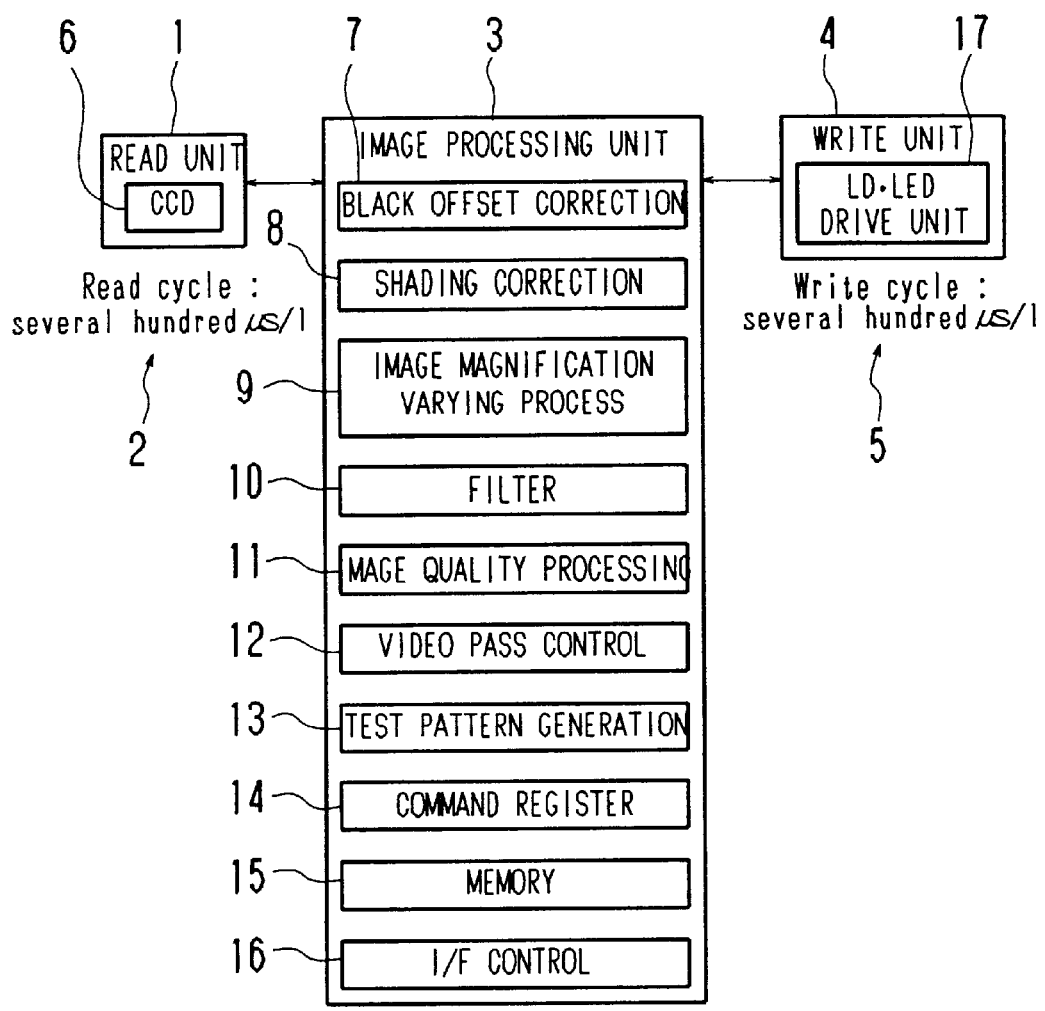
FIG. 1 is a schematic block diagram showing a configuration example of a conventional copying machine.
Figure 2:
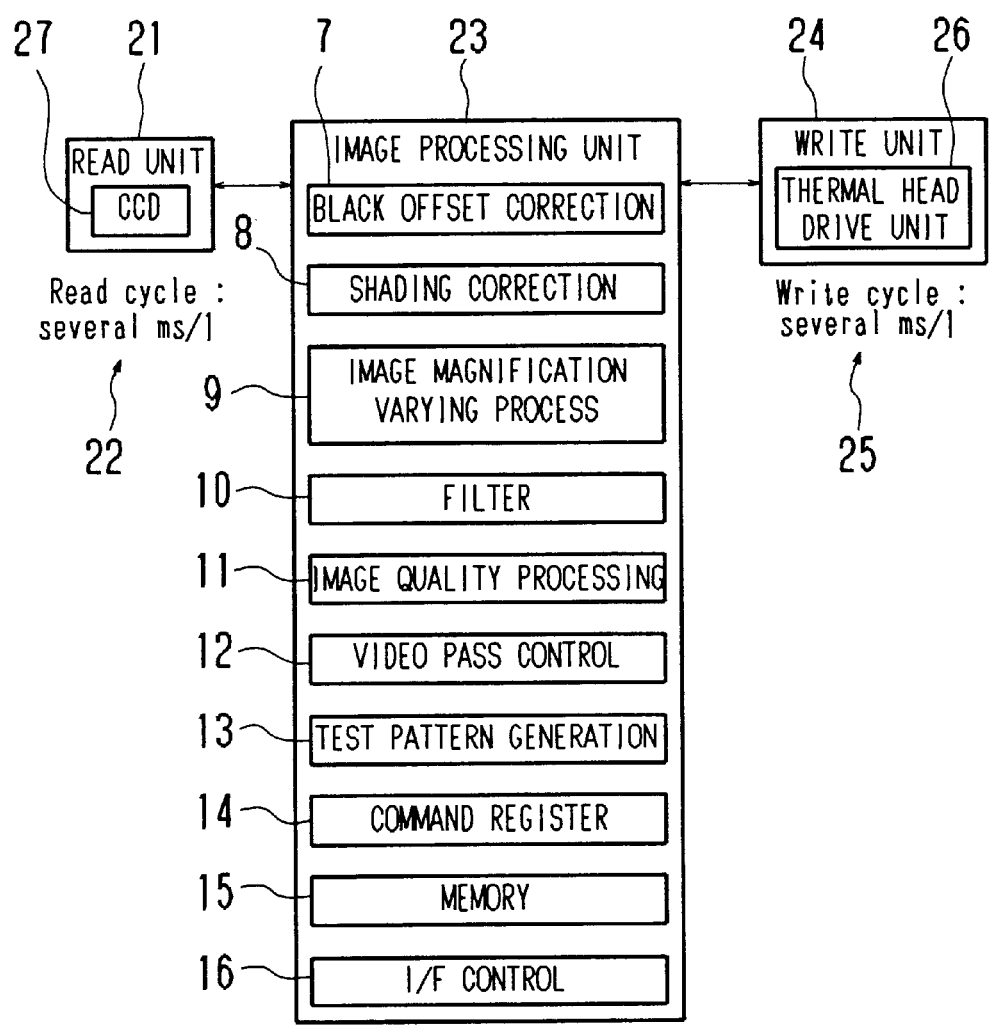
FIG. 2 is a schematic block diagram showing a configuration example of a conventional thermal stencil type digital printer.
Figure 3:
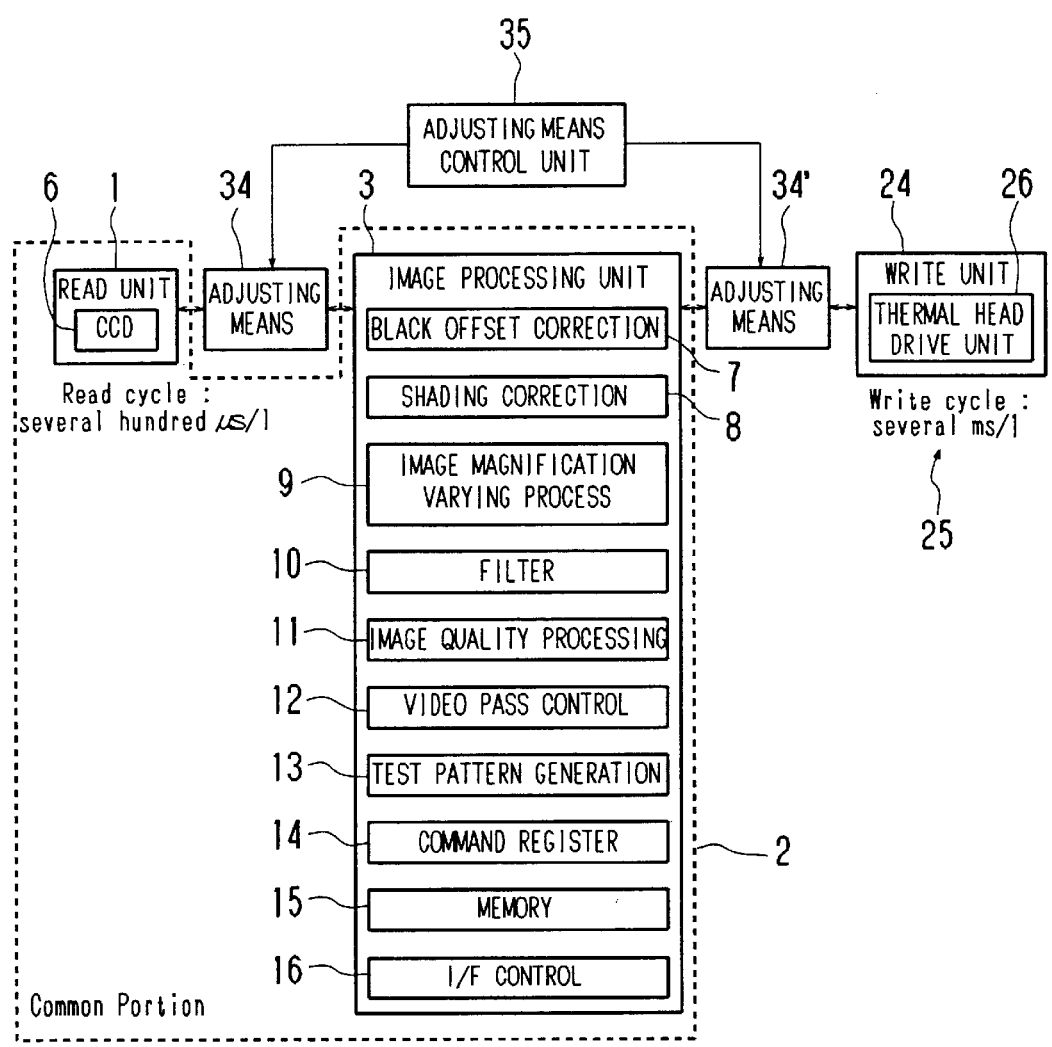
FIG. 3 is a schematic block diagram showing a configuration example of a thermal stencil type digital printer according to an embodiment of the present invention.

An embodiment of the present invention will now be described with reference to FIGS. 3 to 15, in which the same portions as in FIGS. 1 and 2 are identified by the same reference numerals as in FIGS. 1 and 2. As shown in FIG. 3, a thermal stencil type digital printer of this embodiment is roughly made up of a scanner 2 for a digital copying machine, which consists principally of a read unit 1 having high-speed CCDs 6 with a read cycle of several hundred microseconds (347 μs, for example) per line, and a printer 25, which consists principally of a write unit 24 having a low-speed thermal head drive unit 26 with a write cycle of several milliseconds (2 ms, for example) per line. An image processing unit 3 as image processing means is integrally incorporated within the scanner 2.

Figure 4:
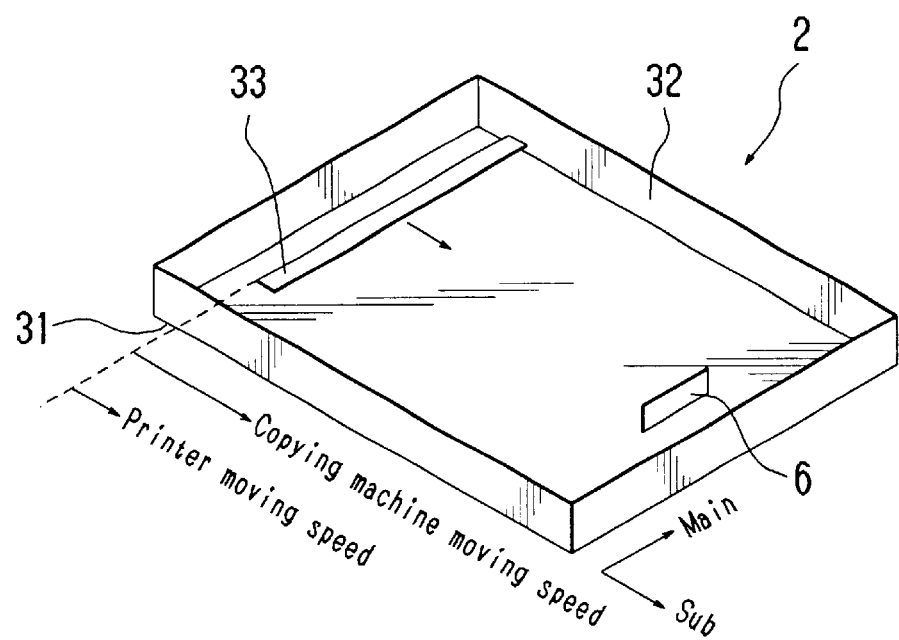
FIG. 4 is a perspective view showing a schematic configuration of a scanner.

In the scanner 2, as schematically shown in FIG. 4, CCDs 6 are incorporated in an apparatus body 31 in an array form in the main scanning direction, and an optical exposure system 33 for focusing an original image onto the CCDs 6 is disposed movably in a sub scan direction, the optical exposure system 33 being provided with a fluorescent lamp and a mirror for exposing and scanning the original image.

In this embodiment, in addition to such a general-purpose scanner 2 as shown in FIG. 4, which comprises the read unit 1 and the image processing unit 3 and which can be applied to a digital copying machine, there is disposed adjusting means 34 between the read unit 1 and the image processing unit 3, as shown in FIG. 3 (adjusting means 34' may be disposed between the image processing unit 3 and the write unit 24). Further added is an adjusting means control unit 35 for controlling the operation of the adjusting means 34 (or 34'). The adjusting means 34 possesses a function of decelerating means for decreasing the moving speed (read speed in the sub scan direction) of the optical exposure system 33 by varying the driving frequency of a stepping motor (not shown) which is for driving the optical exposure system, a function of read operation control means for causing the CCDs 6 to perform such a predetermined read operation as will be described later, and a function of thinning-out means for thinning out image data read by the CCDs 6 under control made by read means. The adjusting means control unit 35 controls the functions of each means in accordance with preset difference in throughput between the read unit 1 and the write unit 24.

The adjusting means 34 (or 34') and the adjusting means control unit 35 constitute a mediating device. The mediating device fulfills a function of mediating a data processing between the scanner 2 and the printer 25 which has a relatively lower write speed than the image read speed of the one-dimensional array-like CCDs 6 provided in the scanner 2.

The function of the mediating device constituted by the adjusting means 34 (or 34') and the adjusting means control unit 35 is actually a function executed by a computer or computers in accordance with a program installed in the computer or computers which is (are) provided in one or both of the digital copying machine having the scanner 2 and the printer 25. For example, such a program is stored in a hard disk or memory area of the digital copying machine or the printer 25. More particularly, such a program is stored in any of various magnetic storage medium such as floppy disk or optical storage mediums such as CD-ROM, CD-R, DVD-ROM, and DVD-RAM and may be installed, for example, in a hard disk of the digital copying machine or the printer 25. In this case, the program may be distributed from a network and the storage medium used is, for example, a memory unit provided in a server such as a provider or a transmission medium such as the Internet.

Figure 5A:
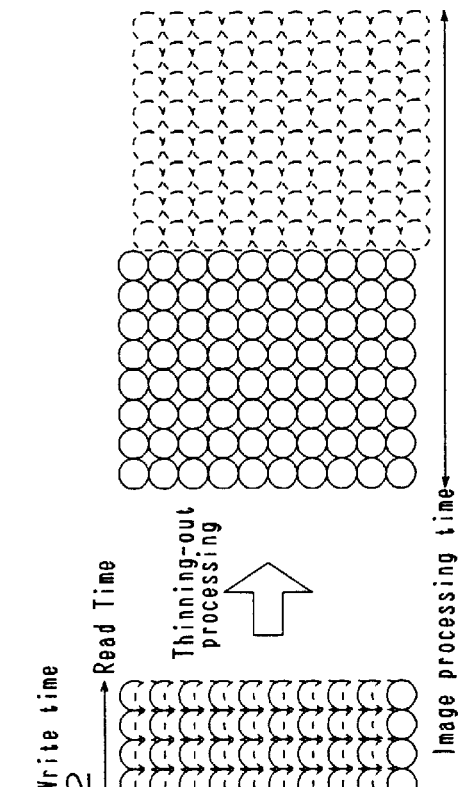
FIG. 5 is a schematic diagram showing a basic example of an original image read-write processing.

In such a configuration, a description will be given below with reference to FIG. 5 about a basic example of an original image read-write processing adopted in this embodiment. In FIG. 5, the circle ○ represents one pixel schematically, and the right and left direction represents the processing time. First, FIGS. 5(A) and 5(B) show schematically an example of processing performed when the read unit 1 is applied to a digital copying machine in which read speed and write speed are in 1:1 correspondence. Both figures show a state in which also in the sub scan direction the main scan lines are read line by line at a normal sub scan speed and at the original read speed of CCDs and the read data are written as they are.

Figure 5C:
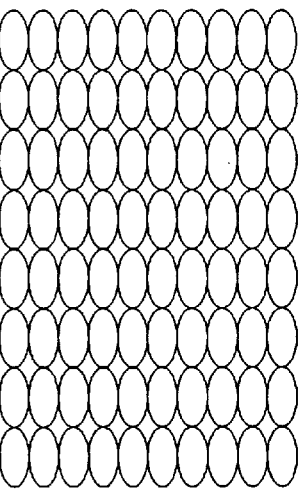
Figure 5D:
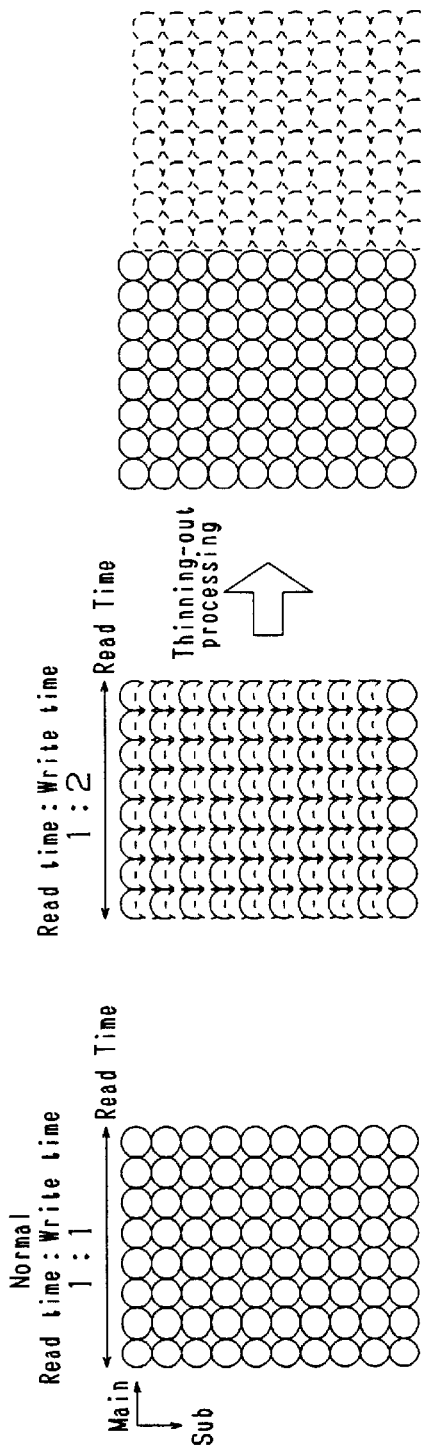
Figure 5E:
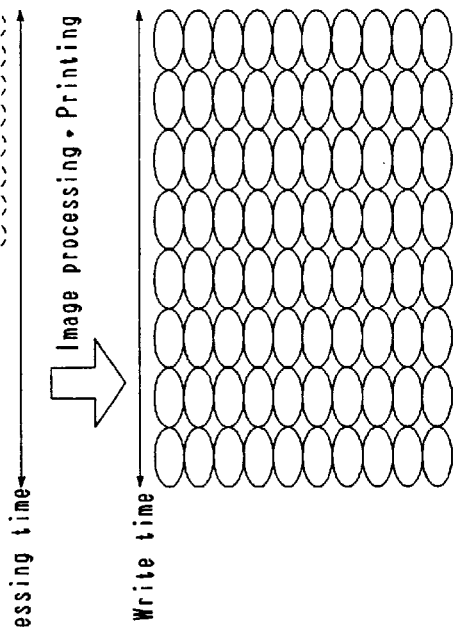
Figure 5B:
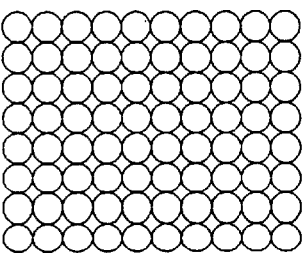

On the other hand, FIGS. 5(C) to 5(E) show an example of processing performed when the read speed is, for example, twice as high as the write speed (that is, the time required for write is twice the time required for read). FIG.

5(C) shows schematically a state in which the drive frequency of the stepping motor is reduced by half to halve the read speed in the sub scan direction and in which an original image on the same main scan line is read by a number of times (m=2) corresponding to a magnification ratio (twice) between the read speed and the write speed (broken line portions indicate overlapped read of the same main scan line). Such an operation is executed by reduction means and read operation control means. If this is expressed in terms of a processing time by main scan line by main scan line, there is obtained such a result as shown in FIG. 5(D), in which the processing time is twice in comparison with that in FIG. 5(A). It is seen that this time can match the processing time on the write unit 24 side. In this case, it is not all of the read image data that are outputted to the write unit 24 side, but only the image data obtained from a single read of a main scan line indicated with solid-line ○ marks in FIG. 5(D) is outputted, while image data obtained from a single read of a main scan line indicated with broken-line ○ are thinned out. Such a thinning-out processing is executed by thinning-out means (see the adjusting means 34 in FIG. 3). Thus, by allowing only such thinned-out image data obtained from a single read of a main scan line to be outputted to the write unit 24 and allowing a write operation to be executed, it becomes possible to write image data of the same density (number of pixels) at the write speed of the write unit 24 itself, as shown in FIG. 5(E). The ○ marks shown in FIG. 5(E) are different from those shown in FIG. 5(B), etc., but there is no change in the physical size of each pixel, with only the processing time being different.

More specifically, when the read speed is twice as high as the write speed, for example, the read speed (moving speed) in the sub scan direction is decreased by half, allowing an original image to be read in an amount corresponding to a twofold main scan line, and thereafter only the image data corresponding to one main scan line out of two main scan lines is outputted as effective image data to the write unit 24 by a thinning-out processing, whereby the processing time can be made twice (=write time of the write unit 24) and thus it is possible to match the processing speed difference on the read unit 1 side and the write unit 24 side.

Figure 6A:
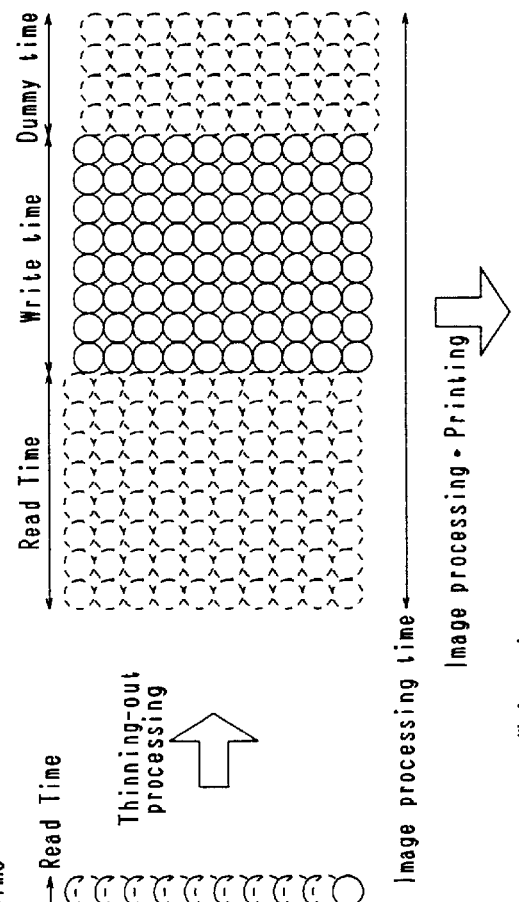
FIG. 6 is a schematic diagram showing a basic example of an original image read-write processing performed in the case of including a fraction of m=2.5.
Figure 6B:
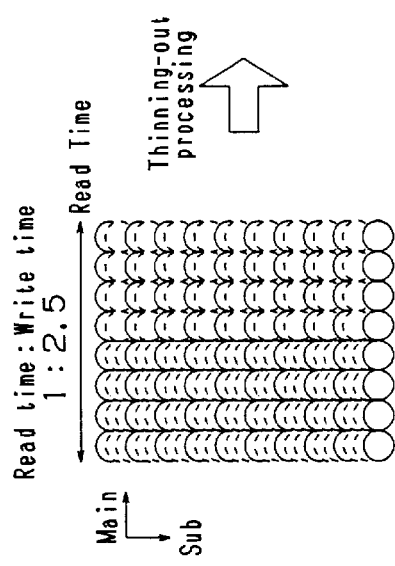
Figure 6C:
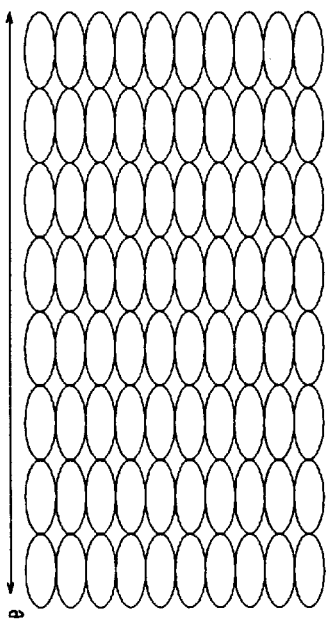

The relation between the read speed of the read unit 1 and the write speed of the write unit 24 is not limited to the case of an integer multiple such as m=2, but may be a case where a fraction is included like m=2.5. Reference will here made to the case of m=2.5 as an example. As shown in FIG. 6, the CCDs 6 may be allowed to perform an irregular operation so as to read 2.5 lines at a time by including a dummy read cycle for reading a fraction (=0.5 line) smaller than one line (occupying a ½ dummy time of a single main scan line read time). After the read, only the image data of one main scan line out of 2.5 lines image data are outputted as effective data to the write unit 24. In this case, the image data just after the dummy read cycle can contain wrong data which is attributable to unstableness caused by the irregular operation of the CCDs 6. Therefore, the image data for one main scan line just after the dummy read cycle are thinned out and another main scan line is selected so as to output the image data thereon to the write unit 24. The solid-line ○ marks in FIG. 6(B) show this state schematically. In the case of m<2 like m=1.5, there is no room for selection because one main scan line other than the dummy read cycle is specified.

Figure 7:
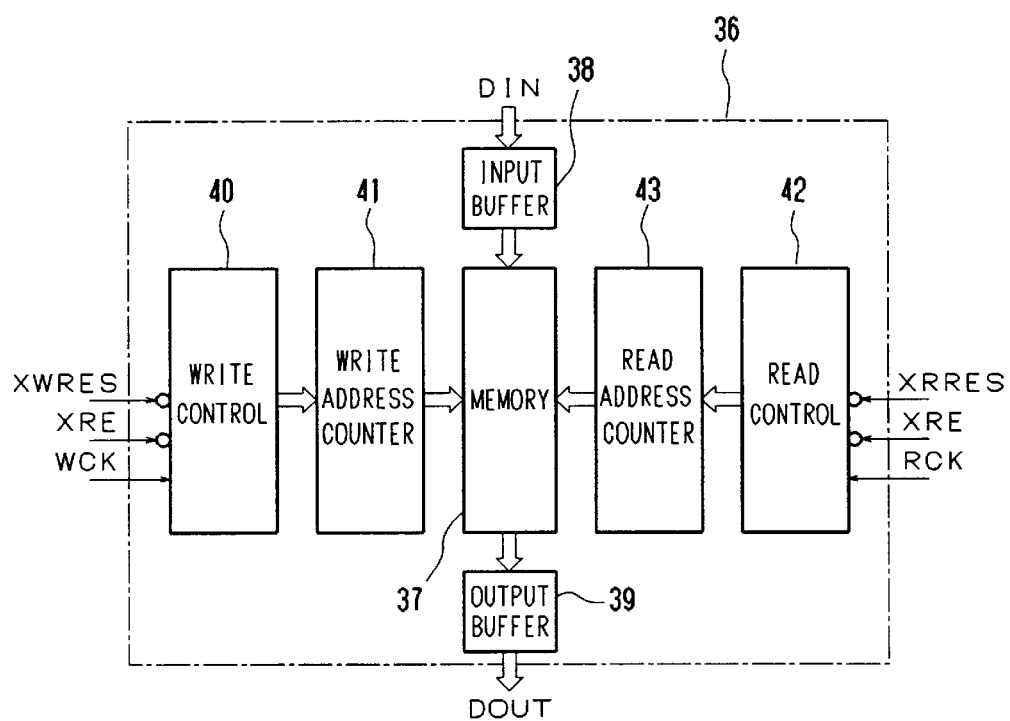
FIG. 7 is a block diagram showing a configuration example in which a FIFO (First In First Out) memory is used as thinning-out means.

Referring now to FIG. 7, there is shown a configuration example of thinning-out means (adjusting means 34 or 34') which permits a thinning-out processing to be carried out in a simple manner, including the case where m is a fraction. In this example, a FIFO (First In First Out) memory 36 is used as thinning-out means. The FIFO memory 36 comprises a memory 37, an input buffer 38 positioned on a data input side, an output buffer 39 positioned on a data output side, a write controller 40 for controlling the write operation for the memory 37, a write address counter 41, a read controller 42 for controlling the read operation, and a read address counter 43.

In writing in such a configuration, input data DIN is loaded into the memory 37 in synchronism with a leading edge of a write clock WCK when the level of Write Enable XWE is low. At this time, the write address counter 41 is also incremented. On the other hand, when the level of Write Enable XWE is high, write is inhibited and the write address counter 41 stops. Further, when the level of Write Reset XWRES is low, the write address counter 41 is initialized. In reading, when the level of Read Enable XRE is low, output data DOUT is outputted from the memory 37 in synchronism with a leading edge Read Clock RCK. At this time, the read address counter 43 is also incremented. On the other hand, when level of Read Enable XRE is high, read is inhibited and the read address counter 43 stops. Further, when the level of Read Reset XRRES is low, the read address counter 43 is initialized.

Thus, according to the FIFO memory 36, write and read can be performed at respective different cycles independently and asynchronously. Therefore, in the case of a fraction like m=2.5, a thinning-out processing can be done by recognizing in the adjusting means control unit 35 that m is 2.5 and by loading image data of one scan line indicated with solid-line ○ marks in FIG. 6(B) into the memory 36.

Thinning-out means is not limited to the FIFO memory 36, but there may be used, for example, such a thinning-out circuit 44 as shown in FIG. 8. The thinning-out circuit 44 is made up of a read synchronizing signal counting unit 46 which repeats counting a register set value for a thinning-out number comparing unit 45, a fetch position comparing unit 47 which determines a line to be made effective when performing the thinning-out processing (since the line to be made effective is determined, other lines than the determined line are lines to be thinned out), a synchronizing signal/image signal latch unit 48 to which a synchronizing signal, an image signal, and a clock clk are inputted, and a thinning-out unit 49 which performs a thinning-out processing for the image signal latched by the synchronizing signal/image signal latch unit 48 so that only the line determined by the fetch position comparing unit 47 becomes effective. The number of lines to be thinned out in the thinning-out number comparing unit 45 can be set by register. For example, the number of lines to be thinned out is set to 6 when only one out of six lines is to be made effective, set to 4 when only one out of 3.5 lines is to be made effective, and set to 3 when only one out of 2.8 lines is to be made effective. Thus, when a fraction is included, the fraction is rounded up. A fetch position in the fetch position comparing unit 47 can also be set by register.

Figure 9A:
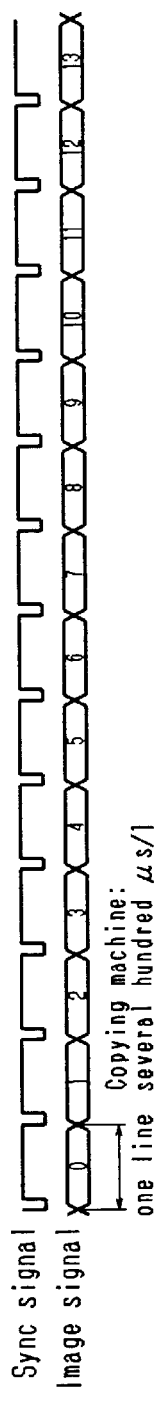
FIG. 9 is a time chart showing a basic example of an original image read-write processing.
Figure 9B:
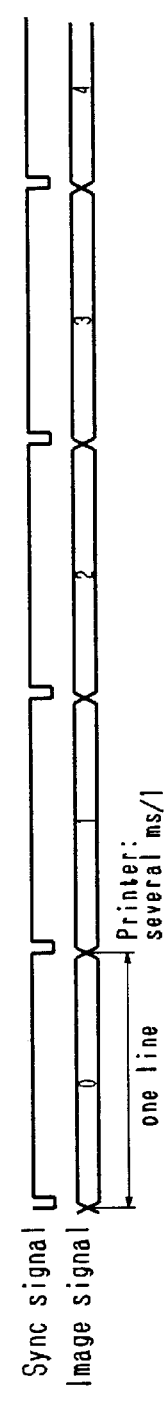

Next, the above basic example of operation control will be described from another viewpoint and with reference to the time chart shown in FIG. 9. First, in the case where the read unit 1 side and the write unit 24 side are merely used, the read of each line is controlled in accordance with a line synchronizing signal of a cycle corresponding to several hundred μs per line on the read unit 1 side, as shown in FIG. 9(a), while on the write unit 24 side, as shown in FIG. 9(b), the write of each line is controlled in accordance with a line synchronizing signal of a cycle corresponding to several ms per line. Thus, both operations do not match.

Figure 9C:
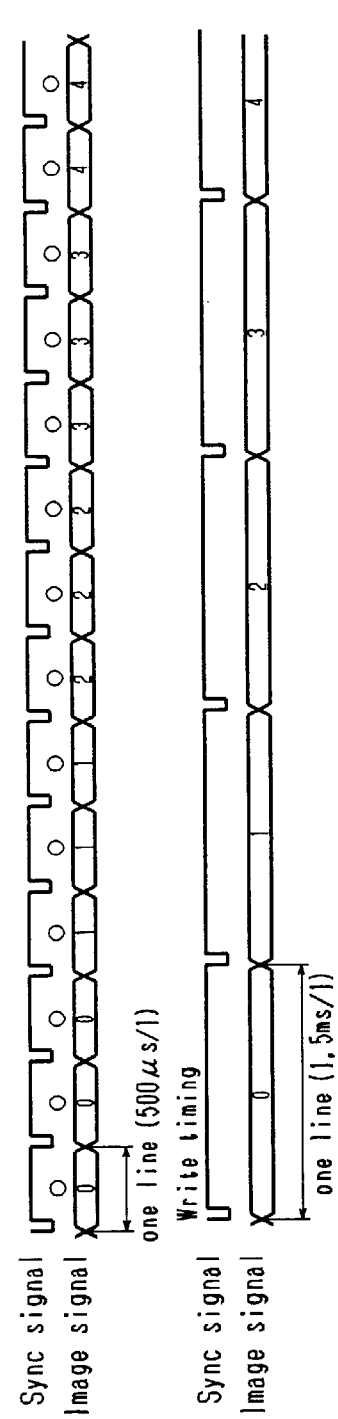

In this embodiment, for example in the case where the read speed of the read unit 1 is 500 μs per line and the write speed of the write unit 24 is 1.5 ms per line (m=3), as shown in FIG. 9(c), the read unit 1 is allowed to read an original image at a read speed of 500 μs per line in accordance with its own synchronizing signal, while the write unit 24 is allowed to write at a write speed of 1.5 ms per line in accordance with its own line synchronizing signal. However, in the read operation, the same main scan line is read by a number of times corresponding to three lines (the numerals "0," "1," . . . in the read image signal each represent a main scan line) to match the processing time required for writing one line. If three lines of image data are outputted as they are to the write unit 24 side, an image magnified three times will be reproduced in the sub scan direction, so there is performed a thinning-out processing (see adjusting means 34' in FIG. 3) so that only image data of one main scan line are outputted to the write unit 24 side. In FIG. 9(c), the ○ mark in the image signal at the read timing indicates a line which may be selected out of three lines of image data. In the illustrated case (m=integer), it is shown that any one main scan line may be selected.

Figure 10:
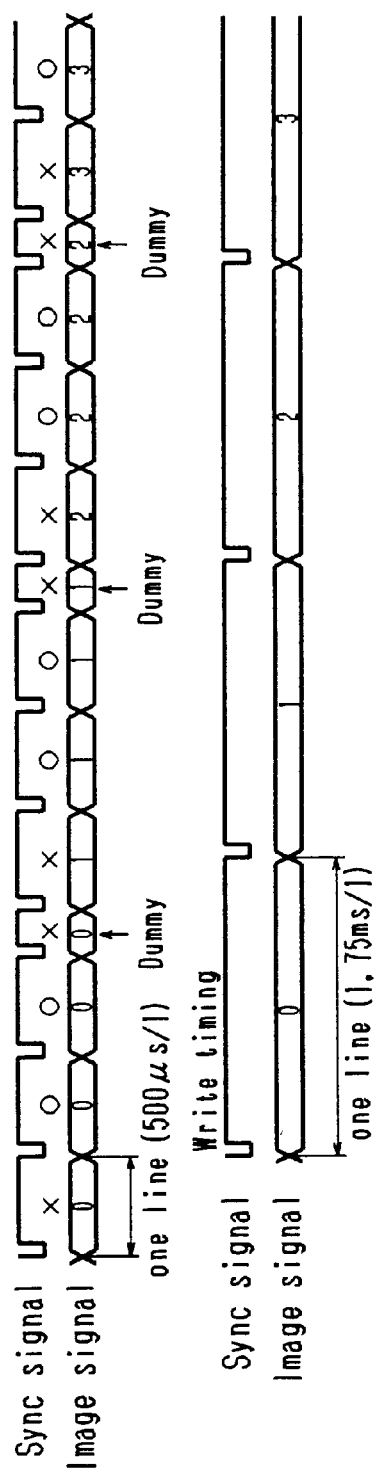
FIG. 10 is a time chart showing a basic example of an original image read-write processing performed in the case of including a fraction of m=3.5.

Also in this case, if the read speed of the read unit 1 is 500 μs per line, the write speed of the write unit 24 is 1.75 ms per line, and there is included a fraction like m=3.5, then as shown in FIG. 10, a dummy read cycle for reading a fraction (=0.5 line) smaller than one line (occupying a dummy time of ½ of one main scan line read time) is included and the CCDs 6 are allowed to perform an irregular operation so as to read 3.5 lines by 3.5 lines to match the processing time required for writing one line. After the read, only the image data of one main scan line out of 3.5 lines of image data is made effective and outputted to the write unit 24. At this time, the image data just after the dummy read cycle may contain wrong data caused by unstableness which is attributable to the irregular operation of the CCD 6. Therefore, the image data of one main scan line just after the dummy read cycle is thinned out and one main scan line is selected so as to output the image data of another one main scan line to the write unit 24. The ○ mark in the image signal at the read timing in FIG. 10 indicates a line which may be selected out of 3.5 lines of image data, while the X mark indicates a line which must not be selected.

Figure 11:
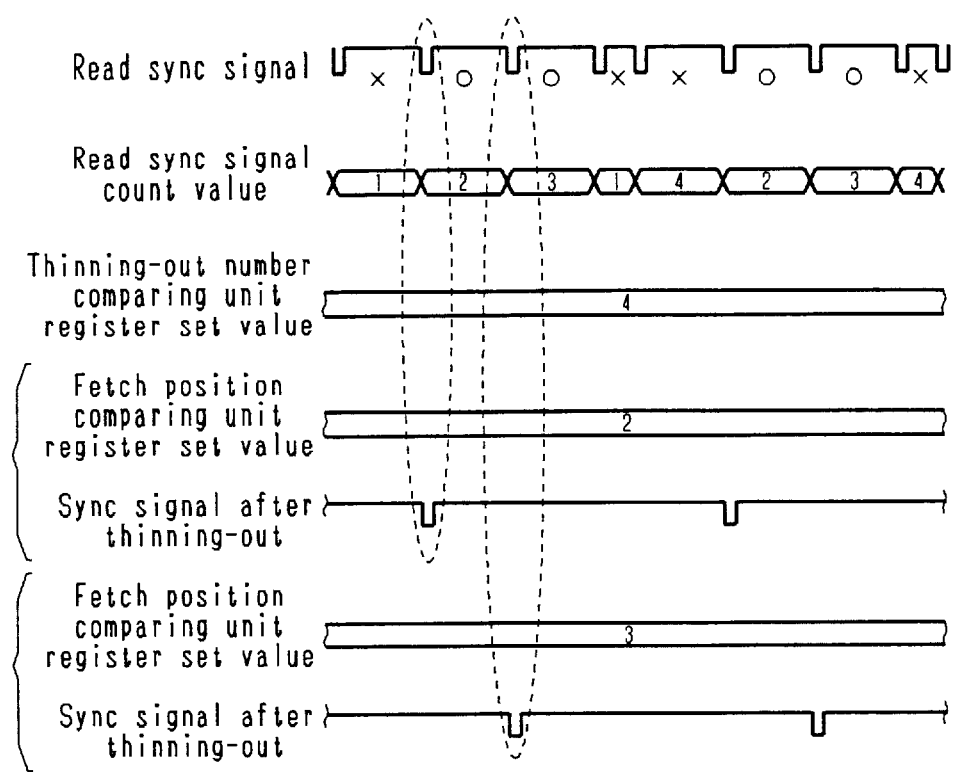
FIG. 11 is a time chart showing an example of processing performed by the thinning-out circuit shown in FIG. 8 in the case of including a fraction of m=3.5.

FIG. 11 is a time chart showing an example of thinning-out processing performed by the thinning-out circuit 44 shown in FIG. 8 in the case of setting the register setting register set value of the thinning-out number comparing unit 45 into 4 and the register set value of the fetch position comparing unit 47 into 2 or 3 in the fraction m=3.5.

The above basic example of operation control will now be described from the standpoint of the number of pixels and with reference to the schematic diagram of FIG. 12. First, in the case of a digital copying machine, both read cycle and write cycle are coincident with each other and each main scan line is the same in the number of pixels as N, so the processing for each line is as shown in FIG. 12(a).

In this embodiment, the read cycle and the write cycle are not coincident with each other. For example, there is a relation of read cycle*4=write cycle, so for performing a read operation in conformity with the write cycle, read should be done four lines for one write line to match the write operation. But it follows that image data corresponding to 4N pixels have been read. Therefore, image data 3N of three lines should be thinned out, allowing only one line of image data N to be outputted to the write unit 24, whereby a match can be taken also with respect to the number of pixels.

Also in this case there is obtained a relation of read cycle of the read unit 1*3.5=write cycle of the write unit 24, and if there is included a fraction like m=3.5, then as shown in FIG. 13, there is included a dummy read cycle (=a dummy line of M pixels) for reading a fraction (=0.5 line) smaller than one line and the CCDs 6 are allowed to perform an irregular operation so as to read 3.5 lines by 3.5 lines, to match the processing time required for writing one line. But it follows that image data corresponding to 3N+M pixels have been read. Therefore, image data of 2N+M are thinned out, allowing only one line of image data N to be outputted to the write unit 24, whereby a match can be taken also for the number of pixels.

Figure 14:
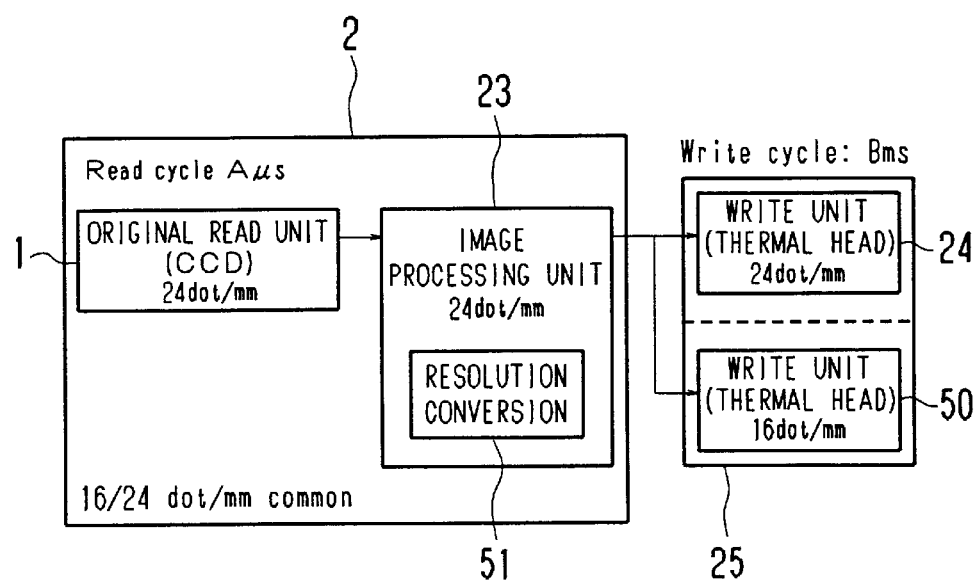
FIG. 14 is a schematic block diagram showing a modification.

Although in the above embodiment the number of pixels (resolution) per line to be processed by the scanner 2 and that to be processed by the printer 25 are made equal to each other, there may be included, for example, resolution conversion means in the image processing unit 3 to cope with the case where both resolutions are different. FIG. 14 shows a configuration example applied to such a case. To be more specific, in the case where a write unit 50 having a write cycle of Bms (e.g., B=1.5 ms) and a resolution of 16 dots/mm (=400 dpi) is provided in addition to the read unit 1 having a read cycle of A μs (e.g., A=347 μs) and a resolution of 24 dots/mm (=600 dpi), the image processing unit 3 having a resolution of 24 dots/mm, and the write unit 24 having a write cycle of B ms (e.g., B=2 ms) and a resolution of 24 dots/mm, then by including in the image processing unit 23 a resolution conversion means 51 which converts 24 dots/mm to 16 dots/mm by an electric image magnification varying process (thinning-out process), it is possible to allow image data to be outputted properly to the 16 dots/mm write unit 50. The resolution conversion means 51 itself can be implemented by using a known technique.

The reduction means may be implemented using hardware, more specifically, using a reduction mechanism which is generally adopted for varying image magnification, in addition to means for variably controlling the drive frequency of the stepping motor for moving the optical exposure system 33.

Figure 15:
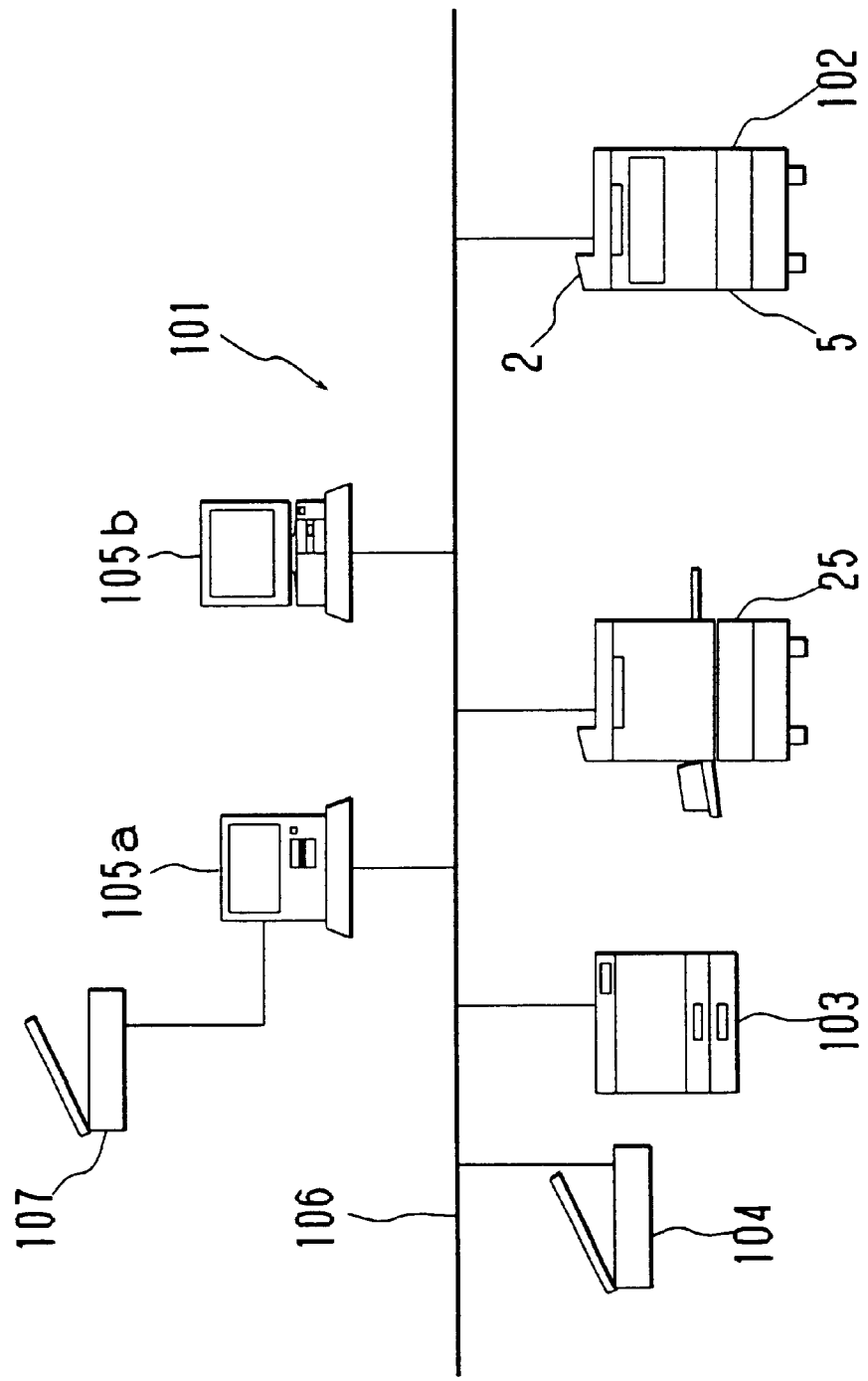
FIG. 15 is a schematic diagram of a network showing an application example of the present invention.

FIG. 15 is a schematic diagram of a network, showing an application example of this embodiment. In this network, indicated at 101, a digital copying machine 102 having the scanner 2 and the printer 5, the printer 25, a printer 103 such as a laser printer, an independent scanner 104, and two personal computers 105a and 105b are connected together via a LAN cable 106 for example. In the actual network 101 it is necessary to use a connector such as a hub (not shown). The illustration of such a connector is omitted in FIG. 15. On the other hand, a scanner 107 is connected to the personal computer 105a via a serial interface for example. Basic structures of the scanners 104 and 107 are the same as the structure of the scanner 2 described above.

In such a network configuration, by using various software programs it is possible to realize various combinations between hardware resources for reading images such as the scanners 2, 104, and 107 and hardware resources for image output such as the printers 5, 25, and 103.

For example, an original image read by the scanner 2 can be printed by the printer 25. In this case, the adjusting means 34 (or 34') and the adjusting means control unit 35 are provided in one or both of the digital copying machine 102 and the printer 25. The functions of the adjusting means 34 (or 34') and the adjusting means control unit 35 may be distributed in the digital copying machine 102 and the printer 25. Printing directions can be executed on the digital copying machine 102 side having the scanner 2 or on the printer 25 side, depending on the adjusting means 34 (or 34') and the adjusting means control unit 35.

In another example, an original image read by the scanner 107 which is connected to the personal computer 105a via a serial interface can be outputted to the printer 25 in accordance with directions given by the computer 105a. The original image may be outputted by the printer 5 in the digital copying machine 102 or by the printer 103, but outputting the original image by the printer 25 suits the purport of the present invention. In this case, the adjusting means 34 (or 34') and the adjusting means control unit 35 are provided in at least one of the personal computer 105a, the digital copying machine 102, and the printer 25. The functions of the adjusting means 34 (or 34') and the adjusting means control unit 35 may be distributed in the personal computer 105a, the digital copying machine 102, and the printer 25. Printing directions are given on the personal computer 105a side for example.

In a still another example, an original image read by the scanner 104 which is connected to the LAN cable 106 as an independent device in the network 101 may be outputted to the printer 25 in accordance with directions given by the personal computers 105a and 105b. The original image may be outputted by the printer 5 in the digital copying machine 102 or the printer 103, but outputting the original image by the printer 25 suits the purport of the present invention. In this case, the adjusting means 34 (or 34') and the adjusting means control unit 35 are provided in at least one of the personal computers 105a and 105b, the digital copying machine 102, and the printer 25. The functions of the adjusting means 34 (or 34') and the adjusting means control unit 35 may be distributed in the personal computers 105a and 105b, the digital copying machine 102, and the printer 25. Printing directions are given on the personal computers 105a and 105b side for example.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

The present application is based on Japanese Priority Document Hei 11-327845 filed on Nov. 18, 1999, the content of which are incorporated herein by reference.

What is claimed is:

1. A scanner control method executed in an environment in which a printer is connected to a scanner having a line-like photoelectric transducer which is for reading an original image by photoelectric conversion, the printer having a relatively lower write speed than the read speed of the line-like photoelectric transducer, said method comprising the steps of:

reading an original image on the same main scan line by a number of times, m, corresponding to a magnification ratio between the read speed and the write speed while decreasing the read speed in a sub scan direction; and outputting only the image data obtained from a single read of the main scan line out of the m times of read to the printer side by a thinning-out processing.

2. A scanner control method according to claim 1, wherein when the number of times, m, is a fraction, a dummy read cycle for reading a fraction smaller than one line is included in the m times of read, thereby allowing the line-like photoelectric transducer to perform an irregular operation.

3. A scanner control method according to claim 2, wherein the image data of one main scan line just after the dummy read cycle are subjected to the thinning-out processing (m>2).

4. A scanner control method according to claim 1, wherein the scanner is provided as a scanner function unit in a digital copying machine, and the processing steps are executed in an environment in which the digital copying machine and the printer are connected with each other.

5. A scanner control method according to claim 1, wherein the scanner is an independent device having a scanner function as a main function, and the processing steps are executed in an environment in which the scanner and the printer are connected with each other.

6. A scanner comprising:

a line-like photoelectric transducer which reads an original image by photoelectric conversion;

means for permitting the connection of a printer having a relatively lower write speed than the read speed of the line-like photoelectric transducer;

reduction means for reducing the read speed in a sub scan direction;

read operation control means which causes the line-like photoelectric transducer to read an original image on the same main scan line by a number of times, m, corresponding to a magnification ratio between the read speed and the write speed; and thinning-out means which performs a thinning-out processing in such a manner that only the image data obtained from a single read of the main scan line out of the m times read of the original image performed under control by the read operation control means is outputted to the printer side.

7. A scanner according to claim 6, wherein when the number of times, m, is a fraction, the read operation control means makes control so that a dummy read cycle for reading a fraction smaller than one line is included in the m times of read, thereby allowing the line-like photoelectric transducer to perform an irregular operation.

8. A scanner according to claim 7, wherein the thinning-out means thins out the image data of one main scan line just after the dummy read cycle in the thinning-out processing (m>2).

9. A scanner according to claim 6, wherein the thinning-out means has a FIFO (First In First Out) memory.

10. A scanner according to claim 6, further including resolution converting means.

11. A scanner according to claim 6, wherein the thinning-out means outputs the thinned-out image data obtained from a single read of the main scan line to image processing means which performs a predetermined image processing for image data.

12. A scanner according to claim 6, wherein the thinning-out means performs an thinning-out processing for image data for which a predetermined image processing has been performed by image processing means.

13. A scanner according to claim 6, provided as a scanner function unit in a digital copying machine connected to the printer.

14. A scanner according to claim 6, constituted as an independent device connected to the printer and having a scanner function as a main function.

15. A duplicate printer comprising:

a scanner including, a line-like photoelectric transducer which reads an original image by photoelectric conversion, means for permitting the connection of a printer having a relatively lower write speed than the read speed of the line-like photoelectric transducer, reduction means for reducing the read speed in a sub scan direction, read operation control means which causes the line-like photoelectric transducer to read an original image on the same main scan line by a number of times, m, corresponding to a magnification ratio between the read speed and the write speed, thinning-out means which performs a thinning-out processing in such a manner that only the image data obtained from a single read of the main scan line out of the m times read of the original image performed under control by the read operation control means is outputted to the printer side, and image processing means; and a printer connected to the scanner and having a relatively lower write speed than the read speed of the line-like photoelectric transducer.

16. A mediating device for mediating a data processing between a scanner having a line-like photoelectric transducer for reading an original image by photoelectric conversion and a printer having a relatively lower write speed than the read speed of the line-like photoelectric transducer, the mediating device comprising:

reduction means for reducing the read speed in a sub scan direction of the scanner;

read operation control means which causes the line-like photoelectric transducer to read an original image on the same main scan line by a number of times, m, corresponding to a magnification ration between the read speed and the write speed of the printer; and thinning-out means which performs a thinning-out processing in such a manner that only the image data obtained from a single read of the main scan line out of the m times read of the original image performed under control by the read operation control means is outputted to the printer side.

17. A mediating device according to claim 16, wherein the scanner is provided as a scanner function unit in a digital copying machine, and at least a part of the function is provided in the scanner in an environment in which the digital copying machine and the printer are connected with each other.

18. A mediating device according to claim 16, wherein the scanner is provided as a scanner function unit in the digital copying machine, and at least a part of the function is provided in the digital copying machine in an environment in which the copying machine and the printer are connected with each other.

19. A mediating device according to claim 16, wherein the scanner is an independent device having a scanner function as a main function, and at least a part of the function is provided in the scanner in an environment in which the scanner and the printer are connected with each other.

20. A mediating device according to claim 16, wherein the scanner is an independent device having a scanner function as a main function, and at least a part of the function is provided in the printer in an environment in which the scanner and the printer are connected with each other.

21. A mediating device according to claim 16, wherein the scanner is an independent device having a scanner function as a main function, and at least a part of the function is provided in a computer in an environment in which the computer and the printer are connected with each other through a network.

22. A mediating device according to claim 16, wherein the scanner is an independent device having a scanner function as a main function, and at least a part of the function is provided in a computer in an environment in which the scanner, the printer, and the computer are connected together through a network, the computer executing the transmission and reception of signals and data to and from the scanner and the printer.

23. A storage medium for storing a program, the program being installed in a computer provided in a mediating device, the mediating device mediating a data processing between a scanner having a line-like photoelectric transducer for reading an original image by photoelectric conversion and a printer having a relatively lower write speed than the read speed of the line-like photoelectric transducer, the program causing the computer to execute:

a reduction function of reducing the read speed in a sub scan direction of the scanner;

a read operation controlling function of causing the line-like photoelectric transducer to read an original image on the same main scan line by a number of times, m, corresponding to a magnification ratio between the read speed and the write speed of the printer; and a thinning-out function of performing a thinning-out processing in such a manner that only the image data obtained from a single read of the main scan line out of the m times read of the original image performed under control by the read operation controlling function is outputted to the printer side.

* * * * *